United States Patent
Klein

(10) Patent No.: US 10,028,316 B2
(45) Date of Patent: Jul. 17, 2018

(54) NETWORK DISCOVERY AND SELECTION

(71) Applicant: BROADCOM CORPORATION, Irvine, CA (US)

(72) Inventor: Philippe Klein, Jerusalem (IL)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 230 days.

(21) Appl. No.: 14/680,975

(22) Filed: Apr. 7, 2015

(65) Prior Publication Data

US 2015/0289296 A1 Oct. 8, 2015

Related U.S. Application Data

(60) Provisional application No. 61/977,038, filed on Apr. 8, 2014.

(51) Int. Cl.

| H04W 76/10 | (2018.01) |
| H04W 76/02 | (2009.01) |
| H04W 48/16 | (2009.01) |
| H04W 48/18 | (2009.01) |
| H04L 29/06 | (2006.01) |

(52) U.S. Cl.
CPC ........... *H04W 76/10* (2018.02); *H04W 48/16* (2013.01); *H04W 48/18* (2013.01); *H04W 76/02* (2013.01); *H04L 63/105* (2013.01)

(58) Field of Classification Search
CPC .................................................. H04W 76/02
See application file for complete search history.

(56) References Cited

U.S. PATENT DOCUMENTS

| 6,351,467 B1 * | 2/2002 | Dillon ............... G06F 17/30017 370/432 |
| 6,363,065 B1 * | 3/2002 | Thornton ................. H04L 12/14 370/352 |
| 6,412,006 B2 * | 6/2002 | Naudus ............. H04L 29/06027 709/203 |
| 6,697,806 B1 * | 2/2004 | Cook ....................... G06F 21/31 |
| 6,714,532 B1 * | 3/2004 | Kawaguchi ......... H04L 12/5692 370/351 |
| 7,177,637 B2 * | 2/2007 | Liu ....................... H04W 12/06 455/41.2 |

(Continued)

*Primary Examiner* — Andrew Lai
*Assistant Examiner* — Andrew C Lee
(74) *Attorney, Agent, or Firm* — McDermott Will & Emery LLP

(57) ABSTRACT

A device for network discovery and selection includes at least one processor circuit that is configured to determine a number of networks available for connection within a configurable set of frequency bands. The at least one processor circuit is further configured to, when a single network is available for connection, and the single network being open, automatically connect to the single network. The at least one processor circuit is further configured to, when multiple networks are available for connection, the multiple networks comprising at least one open network and at least one private network: initiate a timer. The at least one processor circuit is further configured to initiate a connection with the at least one private network when a protected setup is initiated for the connection prior to the timer reaching a timeout value, otherwise connect to the at least one open network.

20 Claims, 5 Drawing Sheets

(56) References Cited

U.S. PATENT DOCUMENTS

| | | | | |
|---|---|---|---|---|
| 7,180,876 B1* | 2/2007 | Henry | H04W 48/18 | 370/329 |
| 7,227,872 B1* | 6/2007 | Biswas | H04L 29/12367 | 370/465 |
| 7,599,365 B1* | 10/2009 | Sabol | H04L 61/2514 | 370/389 |
| 8,537,715 B1* | 9/2013 | Vadivelu | H04L 12/5692 | 370/252 |
| 8,539,036 B2* | 9/2013 | Kohli | H04L 67/2814 | 709/213 |
| 8,599,788 B2* | 12/2013 | Song | H04L 63/0272 | 370/328 |
| 8,943,570 B1* | 1/2015 | Kalbag | H04L 63/0815 | 709/225 |
| 9,020,524 B2* | 4/2015 | Honjo | H04W 48/16 | 455/456.1 |
| 9,167,042 B1* | 10/2015 | Ehrhardt | H04L 67/145 | |
| 9,554,311 B1* | 1/2017 | Velusamy | H04W 36/0083 | |
| 9,756,553 B2* | 9/2017 | Soliman | H04W 48/08 | |
| 9,769,022 B2* | 9/2017 | Fonti | H04L 41/0846 | |
| 2002/0075844 A1* | 6/2002 | Hagen | H04L 63/0442 | 370/351 |
| 2002/0160812 A1* | 10/2002 | Moshiri-Tafreshi | H04W 72/0453 | 455/561 |
| 2005/0015584 A1* | 1/2005 | Takechi | H04L 29/12009 | 713/151 |
| 2005/0177515 A1* | 8/2005 | Kalavade | H04L 63/0853 | 705/52 |
| 2005/0262357 A1* | 11/2005 | Araujo | H04L 63/0227 | 713/182 |
| 2005/0273849 A1* | 12/2005 | Araujo | H04L 63/0281 | 726/12 |
| 2006/0039316 A1* | 2/2006 | Ogushi | H04W 8/26 | 370/328 |
| 2006/0116127 A1* | 6/2006 | Wilhoite | H04M 3/42246 | 455/442 |
| 2006/0161639 A1* | 7/2006 | Kato | H04L 29/06 | 709/219 |
| 2007/0019670 A1* | 1/2007 | Falardeau | H04W 48/18 | 370/465 |
| 2007/0076702 A1* | 4/2007 | Yang | H04L 29/06027 | 370/389 |
| 2007/0250631 A1* | 10/2007 | Bali | H04L 41/5019 | 709/226 |
| 2008/0046616 A1* | 2/2008 | Verzunov | H04L 63/0272 | 710/68 |
| 2008/0076393 A1* | 3/2008 | Khetawat | H04W 16/16 | 455/411 |
| 2009/0070477 A1* | 3/2009 | Baum | H04N 21/2187 | 709/231 |
| 2010/0296409 A1* | 11/2010 | Fok | H04W 24/00 | 370/252 |
| 2011/0044304 A1* | 2/2011 | Connelly | H04W 36/0033 | 370/338 |
| 2011/0055372 A1* | 3/2011 | Elyashev | G06F 9/4418 | 709/224 |
| 2011/0225447 A1* | 9/2011 | Bostick | G06F 21/85 | 714/4.11 |
| 2011/0305241 A1* | 12/2011 | Yang | H04L 29/06027 | 370/392 |
| 2011/0314145 A1* | 12/2011 | Raleigh | H04L 41/0893 | 709/224 |
| 2012/0026903 A1* | 2/2012 | Song | H04W 76/046 | 370/252 |
| 2012/0069385 A1* | 3/2012 | Von Hatten | G06F 3/1203 | 358/1.15 |
| 2012/0069389 A1* | 3/2012 | Funatsu | G06F 3/122 | 358/1.15 |
| 2012/0096541 A1* | 4/2012 | Larson | H04L 29/12066 | 726/15 |
| 2012/0117236 A1* | 5/2012 | Fukuda | G06Q 30/04 | 709/225 |
| 2012/0124217 A1* | 5/2012 | Bartley | G06F 1/3209 | 709/227 |
| 2012/0230305 A1* | 9/2012 | Barbu | H04W 48/20 | 370/338 |
| 2012/0297087 A1* | 11/2012 | Humble | H04L 41/0213 | 709/238 |
| 2012/0311706 A1* | 12/2012 | Newman | H04L 63/126 | 726/22 |
| 2013/0054762 A1* | 2/2013 | Asveren | H04L 61/2553 | 709/220 |
| 2013/0223375 A1* | 8/2013 | Reif | H04W 48/18 | 370/329 |
| 2013/0318572 A1* | 11/2013 | Singh | H04W 12/08 | 726/4 |
| 2013/0332996 A1* | 12/2013 | Fiala | G06F 21/53 | 726/4 |
| 2013/0346839 A1* | 12/2013 | Dinha | G06F 9/5072 | 715/205 |
| 2013/0347073 A1* | 12/2013 | Bryksa | H04L 63/105 | 726/4 |
| 2014/0003408 A1* | 1/2014 | Chhabra | H04W 48/16 | 370/338 |
| 2014/0189135 A1* | 7/2014 | Lawson | H04L 63/0272 | 709/227 |
| 2014/0207946 A1* | 7/2014 | Bakthavathsalu | H04L 63/0272 | 709/224 |
| 2014/0334335 A1* | 11/2014 | Barathalwar | H04W 48/16 | 370/254 |
| 2014/0351448 A1* | 11/2014 | Vinapamula Venkata et al. | H04L 45/302 | 709/227 |
| 2015/0215832 A1* | 7/2015 | Fitzpatrick | H04W 48/18 | 455/426.1 |

\* cited by examiner

NETWORK DISCOVERY AND SELECTION

CROSS-REFERENCE TO RELATED APPLICATIONS

The present application claims the benefit of U.S. Provisional Patent Application Ser. No. 61/977,038, entitled "Network Discovery and Selection," filed on Apr. 8, 2014, which is hereby incorporated by reference in its entirety for all purposes.

TECHNICAL FIELD

The present description relates generally to network discovery and selection over a shared network infrastructure, including network discovery and selection for multimedia over coax alliance (MoCA) networks.

BACKGROUND

Multiple different networks may share a common network infrastructure, such as a common transmission medium, in a given network environment. For example, a network environment in a dwelling unit may include multiple different networks that share one or more common network transmission media, such as one or more MoCA networks that share coaxial transmission media, one or more power-line networks that share a power-line transmission media, and the like. Furthermore, if the dwelling unit is part of a multi-dwelling unit, the dwelling unit may share a coaxial backbone and/or a power-line backbone with other dwelling units in the multi-dwelling unit. In this instance, signals from networks of other dwelling units in the multi-dwelling unit may leak over the shared coaxial backbone and/or the shared power-line backbone into the network environment of the dwelling unit.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Figure 1:
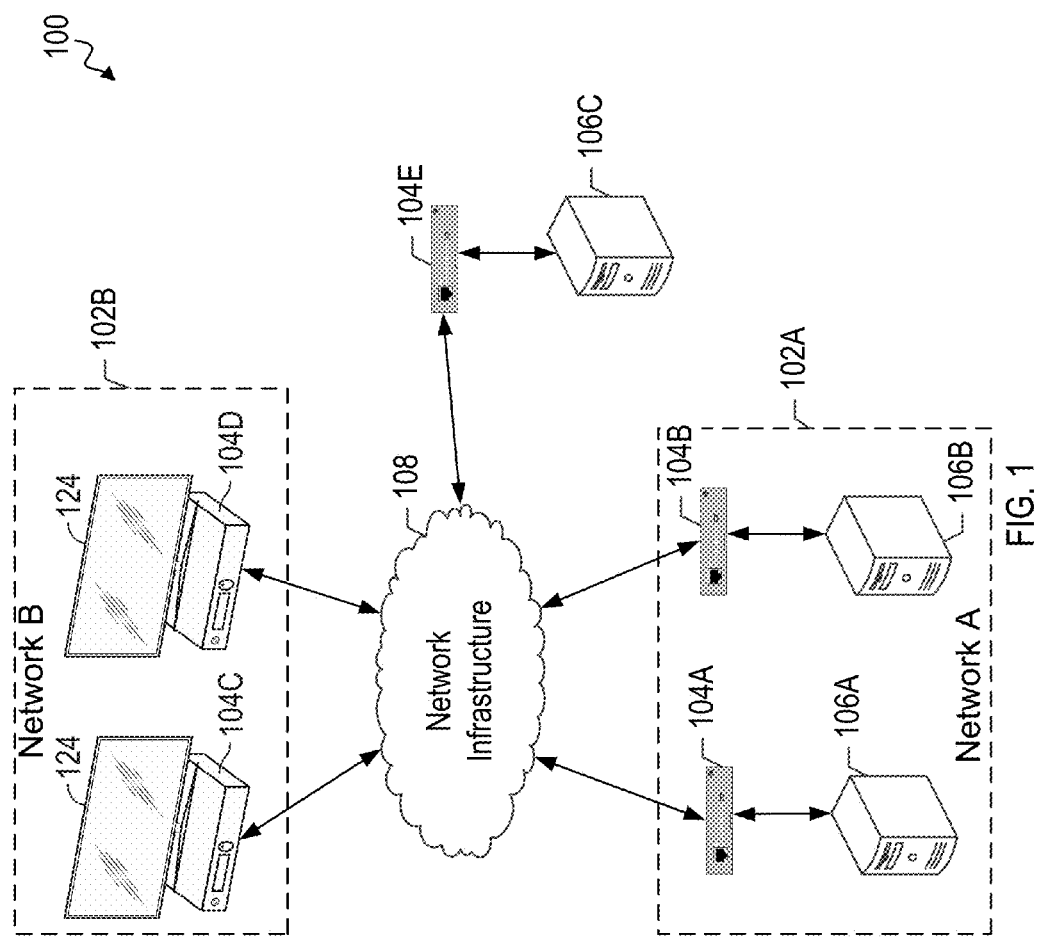
FIG. 1 illustrates an example network environment in which a network discovery and selection system may be implemented in accordance with one or more implementations.

FIG. 1 illustrates an example network environment 100 in which a network discovery and selection system can be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes one or more network devices 104A-E that form and/or participate in one or more networks 102A-B over a network infrastructure 108. The network infrastructure 108 may include one or more network transmission media and may also include one or more devices, such as switches, routers, etc., that facilitate wireless and/or wire-line transmissions of the network devices 104A-E over the network infrastructure 108. The one or more network transmission media may include one or more of coaxial transmission media, an Ethernet transmission media, a power-line transmission media, etc. In one or more implementations, the network infrastructure 108 exists in an office building, a dwelling unit, and/or a multi-dwelling unit. In one or more implementations, the network infrastructure 108 includes one or more transmission media, such as a coaxial and/or power-line backbone, that is coupled to transmission media in multiple different dwelling units.

For explanatory purposes, the network devices 104A,B,E are depicted in FIG. 1 as bridge devices, such as network adapter devices, while the network devices 104C,D are depicted as set-top box devices. Thus, the network devices 104A,B,E are coupled to respective electronic devices 106A-C, such as computing devices, other network devices, etc., while the set-top box devices 104C-D are coupled to output devices 124, such as televisions or other displays. In this manner, the network devices 104A,B,E facilitate transmissions between the electronic devices 106A-C over the network infrastructure 108, for example when the electronic devices 106A-C are not configured to be directly connected to the network infrastructure 108. In one or more implementations, one or more of the network devices 104A,B,E may be integrated in, or a part of, one or more of the electronic devices 106A-C. One or more of the network devices 104A-E, the electronic devices 106A-C, and/or the output devices 124 may include, and/or may be, all or part of the electronic system that is discussed further below with respect to FIG. 5.

In the example network environment 100, the network devices 104A-B form the network 102A, the network devices 104C-D form the network 102B, and the network device 104E has not yet been admitted to any network. The networks 102A-B that are formed by the network devices 104A-D can be separate private networks, such as networks that utilize encrypted communications and/or that require a password or key to join, the networks 102A-B may be separate open networks that utilize open, e.g. unencrypted communications, the network 102A may be an open network while the network 102B is a private network, and/or vice-versa. In one or more implementations, private networks may be referred to as networks that utilize privacy and/or security, while open networks may be referred to as networks that do not utilize privacy and/or security.

One of the network devices 104A-B, such as the network device 104A, is designated as the network coordinator for the network 102A, and one of the network devices 104C-D, such as the network device 104C, is designated as the network coordinator device for the network 102B. Thus, the network device 104A coordinates network transmissions and admission of new network devices for the network 102A and the network device 104C coordinates network transmissions and admission of new network devices for the network 102B. The network devices 104A,C may also transmit discovery, beacon, and/or pilot signals such that the new network devices can discover the networks 102A-B, respectively, and determine whether the networks 102A-B are private or open.

One or more of the network devices 104A-E may each include a protected setup input device that can be activated by the user, such as a push button. A user may, for example, pair or otherwise associate one or more of the network devices 104A-E by consecutively activating the protected setup input device of each of the one or more network devices 104A-E. For example, a user may associate the network device 104A and the network device 104B by pressing the protected setup input device on the network device 104A and, within a given amount of time, subsequently pressing the protected setup input device on the network device 104B, or vice-versa. The protected setup input devices may be used to associate the network devices 104A-E via private networks or open networks.

When one or more of the network devices 104A-E, such as the network device 104A, detects that its protected setup input device has been activated by a user, the network device 104A may broadcast a message indicating the same and may wait for a message from another of the network devices 104B-E, such as the network device 104E, indicating that the user activated the protected setup input device on the network device 104E. The network devices 104A,E may then engage in an admission protocol so that the network device 104E can be admitted to the network 102A, e.g. with or without privacy. When the network 102A utilizes privacy, the admission protocol may include a security mechanism, such as a key exchange between the network devices 104A, E.

In the example network environment 100, when one or more of the network devices 104A-E, such as the network device 104E, is powered on, reset, and/or is otherwise initially connected to the network infrastructure 108, the network device 104E may perform a discovery protocol, such as scanning a configurable set of frequency bands, to identify the networks 102A-B for which communications are being transmitted over the network infrastructure 108. For example, the network device 104E receives the discovery signals transmitted by the network coordinator devices for the networks 102A-B. In the example network environment 100, the scan by the network device 104E discovers the networks 102A-B, and the scan may also determine whether the networks 102A-B are private networks or open networks.

If the network device 104E only discovers a single network that is open, such as the network 102A, the network device 104E immediately, automatically, and without user input or intervention, connects to the open network 102A, such as by initiating an admission protocol with the network coordinator device for the open network 102A. In this manner minimal or no user intervention is required for connecting to the open network 102A, which may simplify the network admission process for the user. However, if the network device 104E discovers the open network 102A and a private network 102B, the network device 104E waits for a period of time prior to automatically connecting to the network 102A. Thus, a user is allocated the period of time to initiate a protected setup with respect to the private network 102B, but if the protected setup is not initiated within the period of time, the network device 104E automatically connects to the open network 102A, thereby still providing the user with the simplified network admission process.

Figure 2:
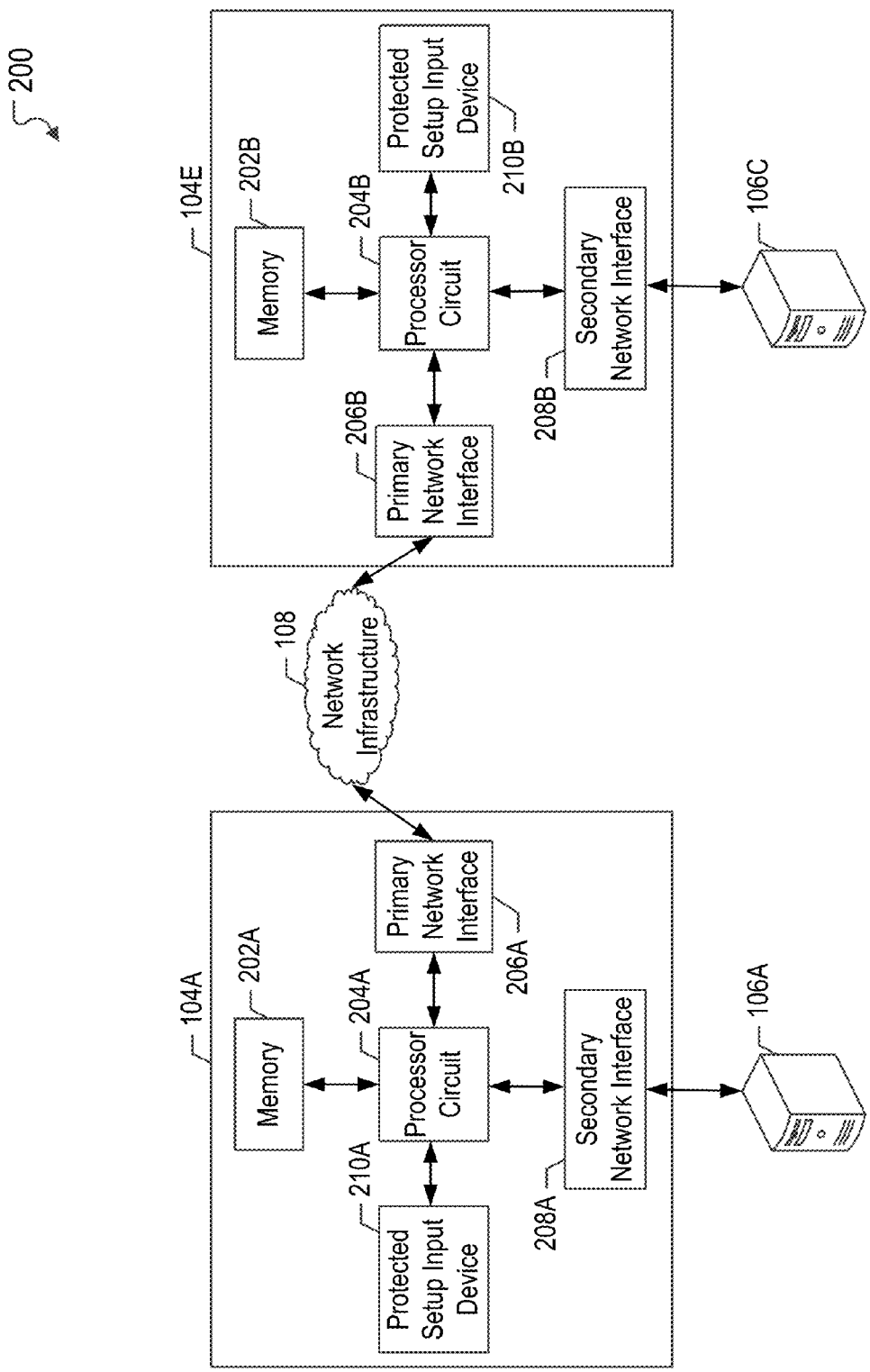
FIG. 2 illustrates an example network environment in which a network discovery and selection system may be implemented in accordance with one or more implementations.

FIG. 2 illustrates an example network environment 200 in which a network discovery and selection system may be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The network environment 200 includes the network devices 104A,E, the electronic devices 106A,C, and the network infrastructure 108. The network device 104A includes a memory 202A, a processor circuit 204A, a primary network interface 206A, a secondary network interface 208A, and a protected setup input device 210A. The network device 104E includes a memory 202B, a processor circuit 204B, a primary network interface 206B, a secondary network interface 208B, and a protected setup input device 210B. In the example of FIGS. 1 and 2, the network devices 104A,E are illustrated as bridge devices that bridge a primary network coupled to the primary network interfaces 206A-B and secondary networks that are coupled to the respective secondary network interfaces 208A-B. The network devices 104A,E may be MoCA bridges, power-line bridges, Wi-Fi bridges, or generally any bridge device.

Thus, the primary network interfaces 206A,B are coupled to the network infrastructure 108, such as via a MoCA and/or power-line connections, while the secondary network interfaces are coupled to the electronic devices 106A-,C, such as via Ethernet connections. For explanatory purposes, individual electronic devices 106A,C are illustrated in FIG. 2 as being communicatively coupled to the secondary network interfaces 208A-B; however, any number of electronic devices may be communicatively coupled to the secondary network interfaces.

The protected setup input devices 210A-B may be electro-mechanical devices that can be activated by a user, such as to authorize a connection to a selected network and/or to initiate a protected setup. The protected setup input devices 210A-B may include one or more of a push button device that can be pushed by a user, a keypad on which a passcode can be entered by a user, a fingerprint scanner or other biometric input device, a or generally any electro-mechanical device to via which physical input can be provided by a user.

In one or more implementations, one or more of the memories 202A-B, the processor circuits 204A-B, the network interfaces 206A-B, 208A-B, and/or the protected setup input devices 210A-B may be implemented in software (e.g., subroutines and code) and/or in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
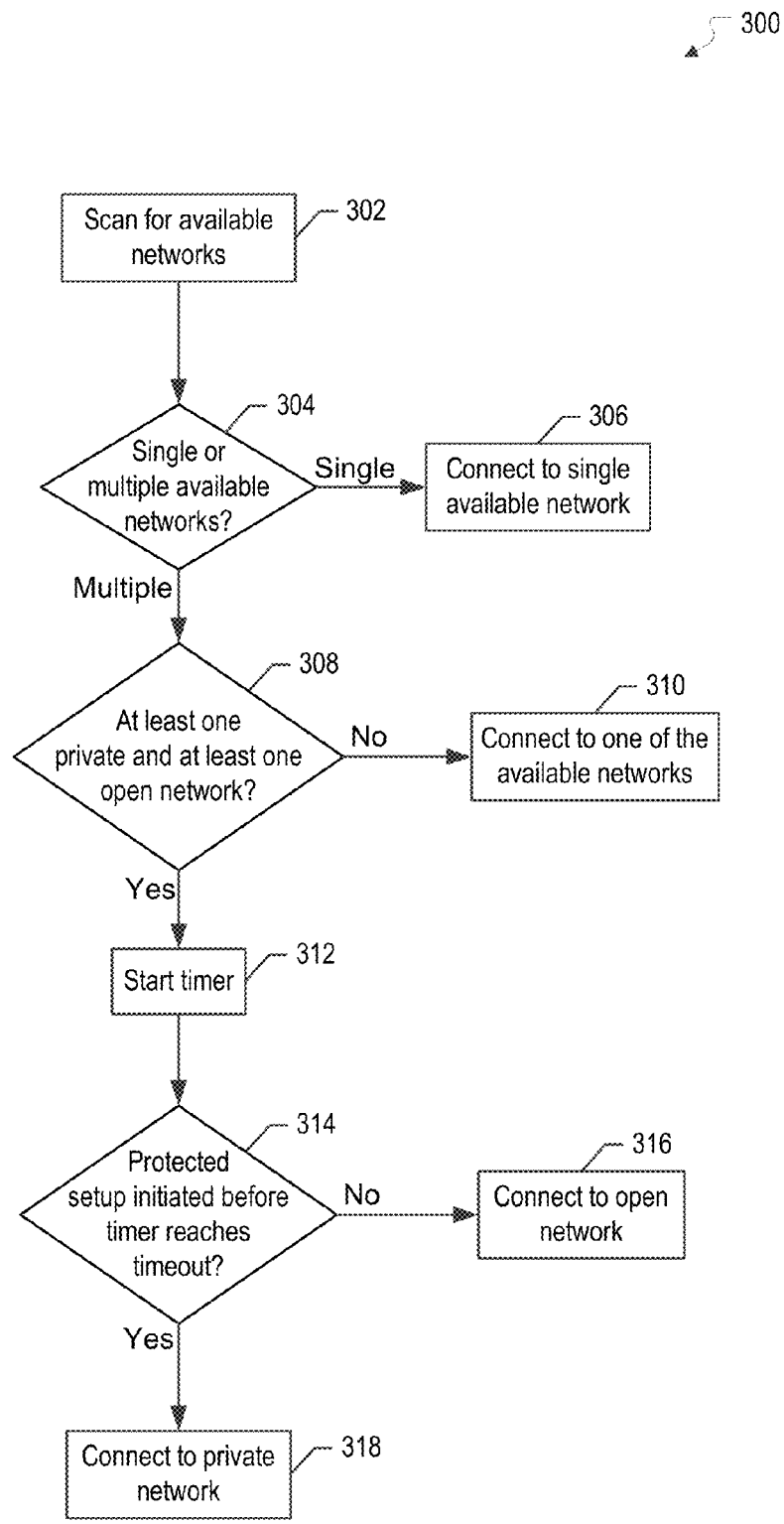
FIG. 3 illustrates a flow diagram of an example process of a network discovery and selection system in accordance with one or more implementations.

FIG. 3 illustrates a flow diagram of an example process 300 of a network discovery and selection system in accordance with one or more implementations. For explanatory purposes, the example process 300 is primarily described herein with reference to the network device 104E of FIGS. 1-2; however, the example process 300 is not limited to the network device 104E of FIGS. 1-2, e.g. the example process 300 may be performed by one or more of the other devices 104A-D and/or the example process 300 may be performed by one or more components of the network device 104E. Further for explanatory purposes, the blocks of the example process 300 are described herein as occurring in serial, or linearly. However, multiple blocks of the example process 300 may occur in parallel. In addition, the blocks of the example process 300 may be performed a different order than the order shown and/or one or more of the blocks of the example process 300 may not be performed.

The network device 104E is added to a network environment, such as the example network environment 100, and scans for available networks (302). For example, the network device 104E scans for signals transmitted by one or more of the other network devices 104A-D, such as discovery, beacon, and/or pilot signals transmitted by network coordinator devices of the available networks 102A-B. In one or more implementations, the network device 104E scans a configurable set of frequency bands for available networks, such as MoCA frequency bands, power-line frequency bands, etc. The network device 104E detects at least one network and determines whether a single network is available or multiple networks are available for connection in the network environment (304).

If the network device 104E determines that a single network is available (304), the network device 104E connects to the single available network (306). If the single available network is an open network and/or is a network that does not utilize privacy and/or security, the network device 104E automatically connects to the network, such as without user intervention. In one or more implementations, the network device 104E negotiates admission to the network with a network coordinator device associated with the network. If the single available network is a private network and/or is a network that utilizes privacy and/or security, the network device 104E connects to the network via a protected setup, as is discussed further below with respect to FIG. 4.

If the network device 104E determines that multiple networks are available in the network environment (304), the network device 104E determines whether at least one of the networks is an open network and at least one of the networks is a private network (308). If the network device 104E determines that the available networks are either all private networks or are all open networks, the network device 104E connects to one of the available networks (310). If the available networks are all open, the network device 104E automatically connects to one of the open networks. If the available networks are all private, the network device 104E connects to one of the private networks via a protected setup, as is discussed further below with respect to FIG. 4.

If the network device 104E determines that at least one of the networks is open and at least one of the networks is private (308), the network device 104E starts, and/or initiates, a timer (312). The timer is set to allow sufficient time for a user to initiate a protected setup with respect to the at least one available private network. The network device 104E determines whether a protected setup is initiated prior to the timer reaching a timeout value, such as by a user activating the protected setup input device 210B of the network device 104E (314). If the network device 104E determines that the timer reached the timeout value before a protected setup was initiated (314), the network device 104E automatically connects to the open network, such as without user intervention (316).

If the network device 104E determines that the protected setup was initiated prior to the timer reaching the timeout value (314), the network device 104E initiates a connection to the private network (318). In one or more implementations, if the protected setup is not completed within a period of time, such as by the user activating a protected setup input device of a network device of the private network, the network device 104E connects to the open network.

Figure 4:
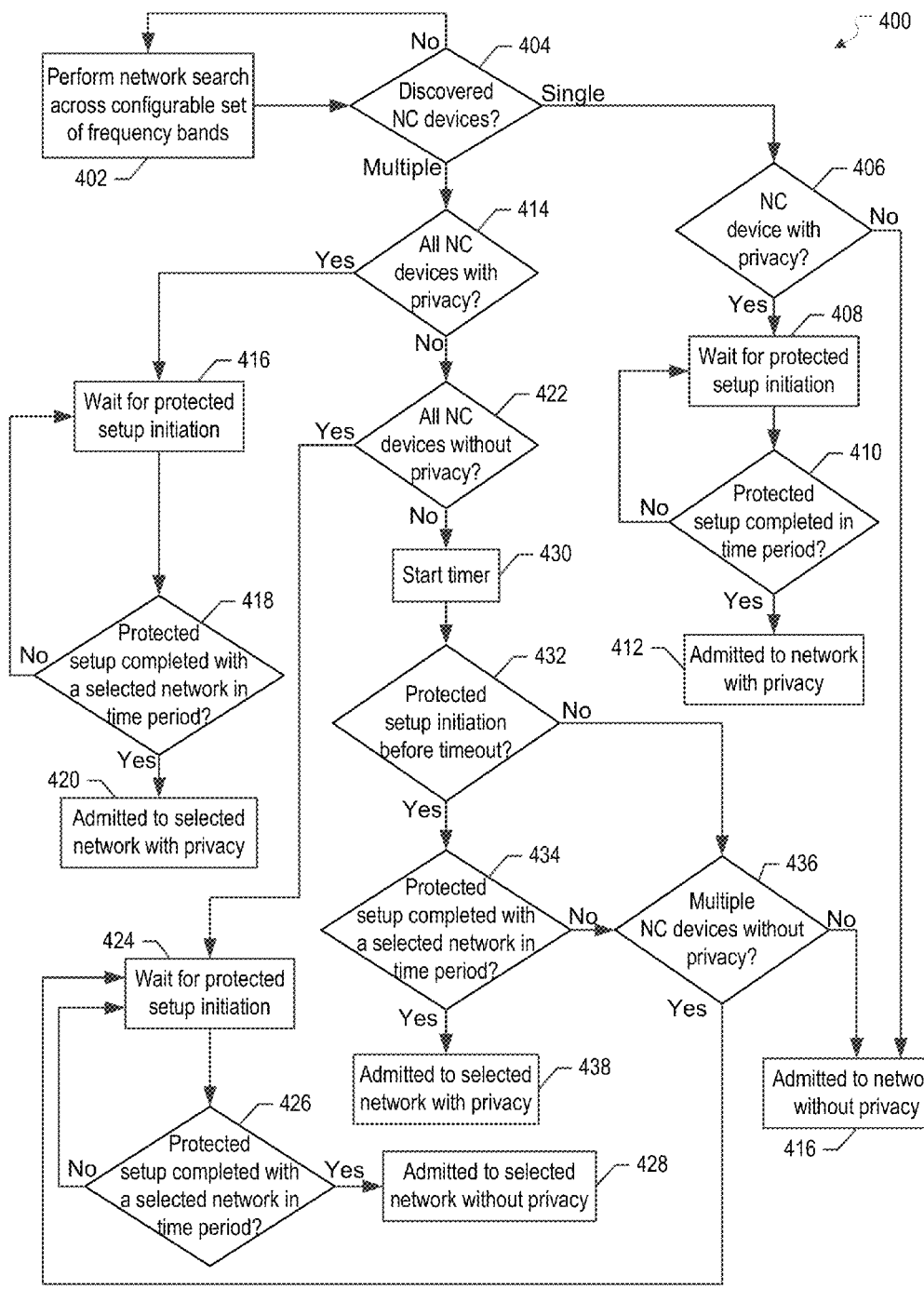
FIG. 4 illustrates a flow diagram of an example process of a network discovery and selection system in accordance with one or more implementations.

FIG. 4 illustrates a flow diagram of an example process 400 of a network discovery and selection system in accordance with one or more implementations. For explanatory purposes, the example process 400 is primarily described herein with reference to the network device 104E of FIGS. 1-2; however, the example process 400 is not limited to the network device 104E of FIGS. 1-2, e.g. the example process 400 may be performed by one or more of the other devices 104A-D and/or the example process 400 may be performed by one or more components of the network device 104E. Further for explanatory purposes, the blocks of the example process 400 are described herein as occurring in serial, or linearly. However, multiple blocks of the example process 400 may occur in parallel. In addition, the blocks of the example process 400 may be performed a different order than the order shown and/or one or more of the blocks of the example process 400 may not be performed.

The network device 104E performs a network search across a configurable set of frequency bands for network coordinator devices in a network environment, such as the example network environment 100 (402). The network coordinator devices may each coordinate transmissions over separate networks with or without privacy. In one or more implementations, the network device 104E performs the network search when the network device 104E is powered on and/or when a hard reset is performed. If the network device 104E does not discover any network coordinator devices (404), the network device 104E continues searching (402).

If the network device 104E discovers a single network coordinator device (404), the network device 104E determines whether the network coordinator device utilizes privacy (406). For example, the discovery messages transmitted by the network coordinator device may indicate whether the network coordinator device utilizes privacy. If the network device 104E determines that the network coordinator device does not utilize privacy, the network device 104E automatically initiates an admission protocol with the network coordinator device and is admitted to the network that is coordinated by the network coordinator device without privacy (416).

If the network device 104E determines that the network coordinator device utilizes privacy (406), the network device 104E waits for the protected setup to be initiated on the network device 104E, such as by a user (408). Once the protected setup is initiated (408), such as by a user activating the protected setup input device 210B of the network device 104E, the network device 104E waits for the protected setup to be completed, such as by a user activating the protected setup input device of the network coordinator device, or another device of the private network. If the protected setup is not completed within a configurable time period (410), the network device 104E restarts the protected setup (408). If the protected setup is completed within the configurable time period (410), the network device 104E is admitted to the network that is coordinated by the network coordinator device with privacy (412).

If the network device 104E determines that all of the discovered network coordinator devices utilize privacy (414), the network device 104E waits for the protected setup to be initiated on the network device 104E, such as by a user (416). Once the protected setup is initiated (416), such as by a user activating the protected setup input device 210B of the network device 104E, the network device 104E waits for the protected setup to be completed by the user, such as by a user activating the protected setup input device of a selected one of the network coordinator devices. If the protected setup is not completed within a configurable time period (418), the network device 104E restarts the protected setup (416). If the protected setup is completed within the configurable time period (418), the network device 104E is admitted to the network that is coordinated by the selected network coordinator device with privacy (420).

If the network device 104E determines that all of the discovered network coordinator devices do not utilize privacy (422), the network device 104E waits for the protected setup to be initiated on the network device 104E, such as by a user (424). In this instance, since none of the network coordinator devices utilize privacy, the protected setup is not used to distribute security and/or authentication information to the network device 104E, such as a password, but rather to provide the user with a mechanism for selecting one of the discovered network coordinator devices to associate with the network device 104E, as a selection of one of the network coordinator devices cannot be performed in an automatic deterministic way. In one or more implementations, the protected setup may be used in this manner by passing a NULL password, and/or an empty password, from the selected network coordinator device to the network device 104E.

Once the protected setup is initiated (424), such as by a user activating the protected setup input device 210B of the network device 104E, the network device 104E waits for the protected setup to be completed, such as by a user activating the protected setup input device of a selected one of the network coordinator devices. If the protected setup is not completed within a configurable time period (426), the network device 104E restarts the protected setup (424). If the protected setup is completed within the configurable time period (426), the network device 104E is admitted to the network that is coordinated by the selected network coordinator device without privacy (428).

If the network device 104E determines that at least one of the discovered network coordinator devices does not utilize privacy (414), and at least one of the discovered network coordinator devices does utilize privacy (422), the network device 104E starts or initiates a timer (430). If a protected setup is not initiated on the network device 104E before the timer reaches the timeout value (432), the network device 104E determines whether there are multiple available network coordinator devices that do not utilize privacy (436). If the network device 104E determines that there are multiple available network coordinator devices that do not utilize privacy (436), the network device 104E waits for a protected setup to be initiated on the network device 104E (424). If the network device 104E determines that there is only a single available network coordinator device that utilizes privacy (436), the network device automatically initiates an admission protocol with the network coordinator device and is admitted to the network that is coordinated by the network coordinator device without privacy (416).

If a protected setup is initiated on the network device 104E before the timer reaches a timeout value (432), such as by a user activating the protected setup input device 210B of the network device 104E, the network device 104E waits for the protected setup to be completed, such as by a user activating the protected setup input device of a selected one of the at least one network coordinator devices that utilize privacy. If the protected setup is completed with a selected network coordinator device within a configurable time period (434), the network device 104E is admitted to the network that is coordinated by the selected network coordinator device with privacy (438).

If the protected setup is not completed with a selected network coordinator device within a configurable time period (434), the network device 104E determines whether there are multiple available network coordinator devices that do not utilize privacy (436). If the network device 104E determines that there are multiple available network coordinator devices that do not utilize privacy (436), the network device 104E waits for a protected setup to be initiated on the network device 104E (424). If the network device 104E determines that there is only a single available network coordinator device that does not utilize privacy (436), the network device 104E automatically initiates an admission protocol with the network coordinator device and is admitted to the network that is coordinated by the network coordinator device without privacy (416).

Figure 5:
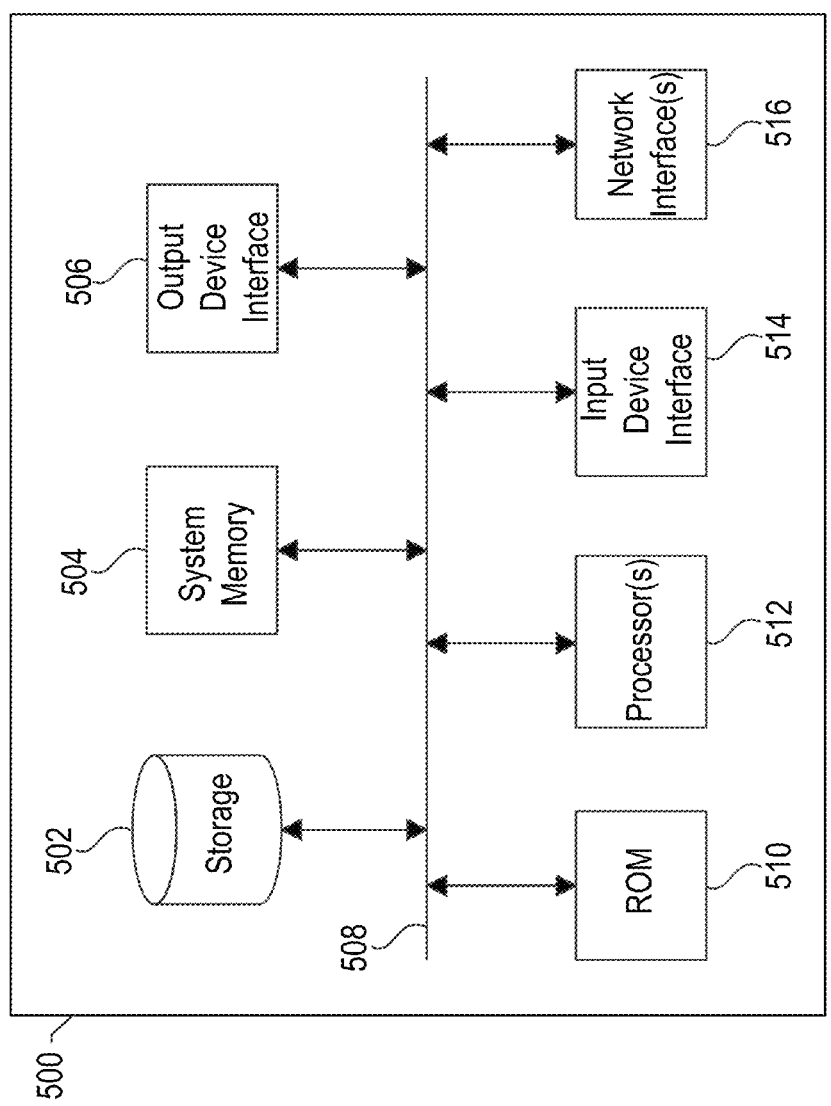
FIG. 5 conceptually illustrates an example electronic system with which one or more implementations of the subject technology can be implemented.

FIG. 5 conceptually illustrates an example electronic system 500 with which one or more implementations of the subject technology can be implemented. The electronic system 500, for example, may be, or may include, one or more of the network devices 104A-E, the electronic devices 106A-C, and/or the output devices 124, one or more wearable devices, a desktop computer, a laptop computer, a tablet device, a phone, and/or generally any electronic device. Such an electronic system 500 includes various types of computer readable media and interfaces for various other types of computer readable media. The electronic system 500 includes a bus 508, one or more processing unit(s) 512, a system memory 504, a read-only memory (ROM) 510, a permanent storage device 502, an input device interface 514, an output device interface 506, one or more network interface(s) 516, and/or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are utilized by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory (RAM). The system memory 504 may store one or more of the instructions and/or data that the one or more processing unit(s) 512 may utilize at runtime. In one or more implementations, the processes of the subject disclosure are stored in the system memory 504, the permanent storage device 502, and/or the ROM 510. From these various memory units, the one or more processing unit(s) 512 retrieve instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by the electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 5, bus 508 also couples electronic system 500 to one or more networks (not shown) through one or more network interface(s) 516. The one or more network interface(s) may include Bluetooth interface, a Bluetooth low energy (BLE) interface, a Zigbee interface, an Ethernet interface, a Wi-Fi interface, a MoCA interface, a HomePlug interface, a reduced gigabit media independent interface (RGMII), or generally any interface for connecting to a network. In this manner, electronic system 500 can be a part of one or more networks of computers (such as a local area network (LAN), a personal area network (PAN), a peer-to-peer network (P2P), a wide area network (WAN), or an Intranet, or a network of networks, such as the Internet. Any or all components of electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, SSD, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "access point", "receiver", "computer", "server", "processor", and "memory" all refer to electronic or other technological devices. These terms exclude people or groups of people. For the purposes of the specification, the terms "display" or "displaying" means displaying on or by an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
at least one processor circuit configured to:
    determine a number of networks available for connection within a configurable set of frequency bands;
    when a single network is available for connection, the single network being open, automatically connect to the single network; and
    when multiple networks are available for connection, the multiple networks comprising at least one open network and at least one private network:
        initiate a timer;
        initiate the connection with the at least one private network when a protected setup is initiated for establishing the connection prior to the timer reaching a timeout value; and
        connect to the at least one open network when the timer reaches the timeout value prior to the protected setup being initiated for establishing the connection.

2. The device of claim 1, wherein the device further comprises a protected setup input device that is configured to initiate the protected setup when activated by a user.

3. The device of claim 2, wherein the protected setup input device comprises an electro-mechanical input device.

4. The device of claim 3, wherein the electro-mechanical input device comprises at least one of a push button or a keypad.

5. The device of claim 2, wherein the at least one processor circuit is further configured to:
    when the protected setup is initiated for the connection prior to the timer reaching the timeout value:
        wait a period of time to receive an indication of a user selection of one of the at least one private networks; and
        in response to receipt of the indication of the user selection of the one of the at least one private networks, connect to the one of the at least one private networks.

6. The device of claim 5, where the at least one processor circuit is further configured to:
    connect to the at least one open network when the user selection of the one of the at least one private networks does not occur within the period of time.

7. The device of claim 5, wherein the user selection of the one of the at least one private networks comprises a user activation of another protected setup input device of another device of the one of the at least one private networks.

8. The device of claim 1, wherein the at least one processor circuit is further configured to:
   scan for available networks within a configurable set of frequency bands.

9. The device of claim 1, wherein the at least one processor circuit is further configured to:
   automatically connect to the single network without user input, without initiating the timer, and without waiting for the timer to reach the timeout value.

10. The device of claim 1, wherein first transmissions over the at least one private network are encrypted and second transmissions over the at least one open network are unencrypted.

11. The device of claim 1, where the at least one processor circuit is further configured to:
   when the multiple networks comprise exclusively private networks or exclusively open networks:
      initiate the connection with one of the multiple networks when the protected setup is initiated.

12. The device of claim 1, wherein the at least one processor circuit is further configured to:
   when the multiple networks comprise exclusively private networks or exclusively open networks and the protected setup is initiated:
      wait a period of time to receive an indication of a user selection of one of the multiple networks; and
      in response to receipt of the indication of the user selection of the one of the multiple networks, connect to the one of the multiple networks.

13. The device of claim 12, wherein the user selection of the one of the multiple networks comprises a user activation of a protected setup input device of another device of the one of the multiple networks.

14. A method comprising:
   scanning, by a device, for network transmissions over a network infrastructure;
   identifying, by the device, the network transmissions over the network infrastructure that correspond to at least one network utilizing open or private network transmissions;
   automatically connecting, by the device, to the at least one network when the at least one network exclusively comprises a first network that utilizes open network transmissions; and
   when the at least one network comprises the first network that utilizes open network transmissions and a second network that utilizes private network transmissions, initiating the connection to the second network when a protected setup is initiated within a period of time, otherwise connecting to the first network.

15. The method of claim 14, wherein the network transmissions that correspond to at least one network are received from a network coordinator device associated with the at least one network.

16. The method of claim 14, wherein the protected setup is initiated when a user activates a protected setup input device.

17. A computer program product comprising instructions stored in a tangible non-transitory computer-readable storage medium, the instructions when executed by at least one processor, cause the at least one processor to:
   discover available networks on a network infrastructure;
   automatically connect to a first network without privacy when the available networks exclusively comprises the first network without privacy and when a protected setup is not initiated within a first period of time and the available networks includes the first network without privacy and a second network with privacy; and
   otherwise wait for activation of a protected setup input device to initiate the protected setup.

18. The computer program product of claim 17, wherein the instructions, when executed by the at least one processor, further cause the at least one processor to:
   detect the initiation of the protected setup;
   wait for a user selection of one of the available networks; and
   in response to the user selection of the one of the available networks, connect to the one of the available networks.

19. The computer program product of claim 18, wherein the instructions, when executed by the at least one processor, further cause the at least one processor to:
   when the available networks includes the first network without privacy and the second network with privacy and the user selection of the one of the available networks is not received within a second period of time, automatically connect to the first network without privacy.

20. The computer program product of claim 18, wherein the protected setup is initiated when a user activates the protected setup input device and the user selection of the one of the available networks comprises a user activation of another protected setup input device of a device associated with the one of the available networks.

* * * * *